United States Patent
Mang et al.

(10) Patent No.: US 10,818,292 B2
(45) Date of Patent: Oct. 27, 2020

(54) METHOD FOR TERM-DEPENDENT OUTPUT OF INFORMATION BASED ON A VOICE INPUT TO A SPECIFIC GROUP, AND SYSTEM

(71) Applicant: Andreas Stihl AG & Co. KG, Waiblingen (DE)

(72) Inventors: Harald Mang, Winnenden (DE); Michael Reinert, Rudersberg (DE); Martin Tippelt, Waldenbuch (DE)

(73) Assignee: Andreas Stihl AG & Co. KG, Wailblingen (DE)

( * ) Notice: Subject to any disclaimer, the term of this patent is extended or adjusted under 35 U.S.C. 154(b) by 0 days.

(21) Appl. No.: 16/456,105

(22) Filed: Jun. 28, 2019

(65) Prior Publication Data

US 2020/0005785 A1 Jan. 2, 2020

(30) Foreign Application Priority Data

Jun. 29, 2018 (EP) .................................. 18180671

(51) Int. Cl.
| H04W 4/16 | (2009.01) |
| H04H 20/59 | (2008.01) |
| H04R 1/10 | (2006.01) |
| H04W 4/14 | (2009.01) |
| G08B 25/10 | (2006.01) |
| G10L 15/22 | (2006.01) |
| G10L 15/08 | (2006.01) |

(52) U.S. Cl.
CPC .............. *G10L 15/22* (2013.01); *G10L 15/08* (2013.01); *G10L 2015/088* (2013.01); *G10L 2015/223* (2013.01)

(58) Field of Classification Search
CPC .......... H04W 4/16; H04W 4/14; G08B 25/10; H04H 20/59; H04R 1/1091; H04Q 7/00; H04L 65/60; G06F 3/011
See application file for complete search history.

(56) References Cited

U.S. PATENT DOCUMENTS

| 6,781,962 B1 | 8/2004 | Williams et al. |
| 10,003,625 B2 * | 6/2018 | Celinski ................. G06F 3/162 |
| 10,315,563 B1 * | 6/2019 | Harper ................... B60Q 5/008 |
| 2005/0170856 A1 * | 8/2005 | Keyani ................... H04W 4/06 455/466 |

(Continued)

FOREIGN PATENT DOCUMENTS

| DE | 42 19 894 A1 | 12/1993 |
| DE | 10 2008 037 690 A1 | 3/2009 |

(Continued)

OTHER PUBLICATIONS

German-language European Search Report issued in counterpart European Application No. 18180671.2 dated Mar. 11, 2019 (19 pages).

*Primary Examiner* — Anne L Thomas-Homescu
(74) *Attorney, Agent, or Firm* — Crowell & Moring LLP

(57) ABSTRACT

A method for term-dependent output of information based on a voice input to a specific group includes the steps of: capturing the voice input; analyzing the captured voice input for the presence of a group-specific key term, associated with the specific group; and on detection of the group-specific key term in the analyzed voice input, outputting the information based on the voice input to the specific group.

15 Claims, 3 Drawing Sheets

(56) References Cited

U.S. PATENT DOCUMENTS

| | | | |
|---|---|---|---|
| 2007/0047479 A1* | 3/2007 | Shaffer | H04L 12/1827 370/328 |
| 2011/0115644 A1 | 5/2011 | Grotendorst et al. | |
| 2011/0142221 A1* | 6/2011 | Tofighbakhsh | H04M 3/44 379/202.01 |
| 2014/0087780 A1* | 3/2014 | Abhyanker | H04W 4/90 455/521 |
| 2014/0253326 A1* | 9/2014 | Cho | G08B 7/066 340/539.13 |
| 2015/0373450 A1* | 12/2015 | Black | H04W 84/08 455/11.1 |
| 2016/0373501 A1 | 12/2016 | Celinski et al. | |
| 2016/0373583 A1 | 12/2016 | Celinski et al. | |
| 2016/0373899 A1 | 12/2016 | Celinski et al. | |
| 2018/0067546 A1* | 3/2018 | Yoshikawa | G06F 3/005 |
| 2018/0103359 A1* | 4/2018 | Albrecht | H04W 4/16 |
| 2018/0115877 A1* | 4/2018 | Riker | H04W 4/02 |
| 2018/0324895 A1 | 11/2018 | Baek et al. | |
| 2019/0045867 A1 | 2/2019 | Zukowski | |
| 2019/0075879 A1 | 3/2019 | Persson et al. | |

FOREIGN PATENT DOCUMENTS

| | | |
|---|---|---|
| ES | 2 324 582 A1 | 8/2009 |
| WO | WO 03/073642 A1 | 9/2003 |
| WO | WO 2016/210007 A1 | 12/2016 |
| WO | WO 2017/009752 A1 | 1/2017 |
| WO | WO 2017/074106 A1 | 5/2017 |
| WO | WO 2017/137083 A1 | 8/2017 |
| WO | WO 20170137083 * | 8/2017 |

* cited by examiner

METHOD FOR TERM-DEPENDENT OUTPUT OF INFORMATION BASED ON A VOICE INPUT TO A SPECIFIC GROUP, AND SYSTEM

CROSS REFERENCE TO RELATED APPLICATIONS

This application claims priority under 35 U.S.C. § 119 from European Patent Application No. 18180671.2, filed Jun. 29, 2018, the entire disclosure of which is herein expressly incorporated by reference.

BACKGROUND AND SUMMARY OF THE INVENTION

The invention relates to a method for term-dependent output of information based on a voice input to a specific group, and to a system for term-dependent output of information based on a voice input to a specific group.

The object on which the invention is based is the provision of a method for outputting information based on a voice input to a group and of a system for outputting information based on a voice input to a group, each of which has improved properties, in particular more functionalities, and/or is user friendly.

The invention achieves the object by providing a method and a system for term-dependent output of information based on a voice input to a specific group in accordance with the claimed invention.

The, in particular automatic, method according to the invention for term-dependent output of information based on a voice input to a specific group has the steps of: a) capturing, in particular automatically capturing, the voice input; b) analyzing, in particular automatically analyzing, the captured voice input for the presence of a group-specific key term associated, in particular logically, with the specific group; and c) on detection, or in the presence, of the group-specific key term in the analyzed voice input, outputting, in particular automatically outputting, the information based on the voice input to the specific group.

The method allows the information to be output to the specific group, in particular without a user or speaker, in particular by whom the voice input can be or may have been spoken, needing to select the specific group for this purpose by means of manual operation. Therefore, the method is user friendly. In particular, the method can allow the user or speaker to have his hands free for another task, in particular at the same time as or during the voice input.

In particular, the information can be relevant, in particular intended, only or exclusively for the specific group. The outputting of the information to the specific group can be referred to as selective output. In other words: the information does not need to be output to another group not associated with the group-specific key term. Therefore, the other group does not need to be unnecessarily bothered, in particular with the information that is not relevant to it.

If a group-specific key term is not present or not detected in the voice input, no information needs to be output, in particular to the specific group.

A minimum volume can be prescribed that a captured sound needs to achieve in order to be deemed a voice input. Additionally or alternatively, the capture of the voice input can be controlled or activated or triggered by a command, in particular a voice command.

In particular, it is possible to constantly or continually or continuously capture or monitor whether the voice input and possibly the voice command, where provided for, takes place. Put another way: it is possible to listen to whether a sound, in particular at the prescribed minimum volume, is present. In other words: every voice input can be captured.

The voice input can have or be a word or a syllable or a sound.

The voice input and possibly the voice command, where provided for, can be or may have been spoken by the user or speaker.

The group-specific key term can be a designation for the specific group or a term different from the specific group designation that can be in the context of the specific group or of at least one specific property of the specific group.

In particular, the voice input can have multiple different group-specific key terms. Each individual group-specific key term can be associated with a single specific group or with multiple, different, specific groups. In particular, a first group-specific key term can be associated with a first specific group and/or a second group-specific key term can be associated with a second specific group, which is different from the first. Additionally or alternatively, a third group-specific key term can be associated with both the first specific group and the second specific group.

The specific group can have a single or multiple group member(s). A group member can be a natural person, or a human being, or a device, in particular a computer or a memory, in particular for storing the information based on the voice input, such as for example a cloud memory, or a machine. A group member, in particular a natural person, can be a member in multiple, different, specific groups. In particular, a group member can be a member of the first specific group and a member of the second specific group.

In addition, the specific group can be defined by virtue of at least one group member of the specific group being able to perform an action or activity referred to by the voice input and/or the information. The group-specific key term can be an action term or an activity term. In particular, a current action or activity, in particular of a natural person, or a human being, can be detected. Based on the detected action, the natural person can be associated with or assigned to the specific group, in particular regrouping or a change of group can take place.

The information can have or be the voice input itself. Additionally or alternatively, the information can be ascertained based on or in response to the voice input, in particular by processing the voice input further, and/or the voice input can be supplemented, in particular automatically. In particular, the output information can inform the specific group about an action or activity to be carried out.

Step b) can be carried out at the same time as step a) and/or at a time thereafter. Step c) can be carried out at the same time as step b) and/or at a time thereafter.

The method can be repeated, in particular multiple times, for at least one further voice input.

In one development of the invention, the specific group is a garden and/or forestry worker group, in particular a felling group, and the group-specific key term is a garden and/or forestry term, in particular a felling term. By way of example, the felling term can be "Tree falling" and/or "Everyone stand clear". On detection of the felling term, the felling group can learn from output of the information that a tree is falling and/or where the tree is falling and hence it is necessary to pay attention to the tree and/or that the felled tree needs to be debranched. Additionally or alternatively, the felling term can be "Tree hanging". On detection of the felling term, the felling group can learn from output of the information that a tree is hanging and/or where the tree is hanging and hence it is necessary to pay attention to the tree and/or that the hanging tree needs to be removed, in particular dragged off. A group member of the garden and/or forestry worker group, in particular the felling group, can be a garden and/or forestry worker, in particular a felling worker, and/or an operator, in particular a driver, of a towing vehicle, in particular an accident prevention regulation towing rig and/or a harvester.

Additionally or alternatively, the specific group is a hauler group and the group-specific key term is a hauler term. By way of example, the hauler term can be "Haul tree". On detection of the hauler term, the hauler group can learn from output of the information that a tree needs to be hauled and/or where the tree needs to be hauled. A group member of the hauler group can be an operator, in particular a driver, of a hauler vehicle, in particular a towing crane and/or a tractor and/or a forwarder and/or a harvester.

Additionally or alternatively, the specific group is a forestry and/or work management group and the group-specific key term is a forestry and/or work management term. By way of example, the forestry and/or work management term can be "Tree felled and hauled". On detection of the forestry and/or work management term, the forestry and/or work management group can learn from output of the information that a tree and/or which tree needs to be denoted as felled and hauled, in particular in the work schedule. Additionally or alternatively, the forestry and/or work management term can be a wood data term, such as for example "medium diameter", "length", "wood type" and/or "wood quality", in particular during processing of a felled tree. On detection of the forestry and/or work management term(s), the forestry and/or work management group can learn, in particular store, the wood data from output of the information. A group member of the forestry and/or work management group can be a forestry commissioner and/or a job manager and/or a job provider and/or a forestry operator.

Additionally or alternatively, the specific group is a rescue group and the group-specific key term is an emergency term and/or a rescue term. By way of example, the emergency term and/or the rescue term can be "Help". On detection of the emergency term and/or the rescue term, the rescue group can learn from output of the information that an emergency or an accident and/or where the emergency has occurred and/or that the user or speaker needs help, in particular first or medical aid. A group member of the rescue group can be a rescuer, in particular a first aider.

In one development of the invention, the method has the step of: ascertaining, in particular automatically ascertaining, a direction from an output location to a capture location. The information has the ascertained direction. This makes it possible to learn the direction in which the capture location is situated in relation to the output location. In particular, the capture location can be a location or a position at which the voice input is and/or has been captured. The output location can be a location or a position at which the information is output. The direction can have or be a point of the compass and/or a route. In particular, the direction can have a value and/or an amount. In particular, the direction can be ascertained from a difference between position coordinates of the capture location and position coordinates of the output location. The position coordinates can be ascertained by means of a local position determination system and/or a satellite position determination system.

In one development of the invention, the method has the steps of: ascertaining, in particular automatically ascertaining, a distance or an interval between a capture location and an output location and, if the ascertained distance is below a distance limit value, outputting, in particular automatically outputting, the information in group-aspecific fashion. In particular, the information, although inherently relevant only to the specific group, can be or become relevant to non-members of the specific group too in a certain proximity to the capture location. The group-aspecific output in the event of the ascertained distance being below the distance limit value allows the information to be learned or gathered independently of group. In particular, the capture location can be a location or a position at which the voice input is and/or has been captured. The output location can be a location or a position at which the information could possibly be output. The distance limit value can have a value that corresponds to a typical height of a tree without or plus a safety factor, in particular of 50 percent (%) or 100%, and/or that corresponds to a typical radius of an action area or an activity area of the user or speaker. The information can have the ascertained distance. In particular, the distance can have a value and/or an amount. Additionally or alternatively, if the ascertained distance is not below, in particular if it is above, the distance limit value, the information can be output only or exclusively in group-specific fashion. As a further addition or alternative, a, in particular the, direction from the output location to the capture location can be ascertained and, if the ascertained direction is in a, in particular defined, direction range, the information can be output in group-aspecific fashion. If the ascertained direction is not in the direction range, the information can be output only or exclusively in group-specific fashion.

In one refinement of the invention, the distance limit value is in a range from 30 meters (m) to 150 m.

In one refinement of the invention, the distance is ascertained by means of a time-of-flight method, in particular a time-of-flight measurement of a radio signal. In particular, a signal can be exchanged between the capture location and the output location and the interchanged signal can be taken as a basis for ascertaining the distance.

Additionally or alternatively, the distance can be ascertained from a difference between position coordinates of the capture location and position coordinates of the output location. The position coordinates can be ascertained by means of a local position determination system and/or a satellite position determination system.

In one development of the invention, the method has the step of: wirelessly transmitting, in particular automatically transmitting, the captured voice input and/or the information, in particular from a capture location to an output location. In particular, a radio signal, in particular a Bluetooth signal and/or a WLAN signal and/or a mobile radio signal and/or a satellite radio signal, can be used for transmission. Additionally, a transmission signal, in particular the radio signal, can be used or exploited for direction ascertainment and/or for distance ascertainment, in particular by means of the time-of-flight method, where provided for.

In one development of the invention, step c) involves the information being output audibly and/or visually and/or haptically. This can allow relatively good perception of the information. In particular, the visual output can comprise or be display. The visual output can comprise projection or insertion into a field of vision, in particular of a natural person. The haptic output can comprise vibration.

In one development of the invention, the method has the step of: d) outputting, in particular automatically outputting, further information based on the output information to a, in particular the, speaker of the voice input and/or at a, in particular the, capture location. In particular, the further information can be ascertained, in particular automatically and/or by the specific group, based on or in response to the output information, in particular by processing the output information further. By way of example, when the information, in particular the voice input, "Haul tree" is output to the hauler group, the further information can be "hauler vehicle empty", in particular if the hauler vehicle is empty. The speaker of the voice input can learn from output of the further information that the hauler vehicle is empty. Additionally or alternatively, when the information is output in the form of wood data to the forestry and/or work management group, the further information can be a work instruction, such as for example assortment sustainment. The speaker of the voice input, in particular a group member of the garden and/or forestry worker group, can learn from output of the further information how a tree needs to be handled. As a further addition or alternative, when the information "Help" is output to the rescue group, the further information can be safety advice, such as for example a rescue point. The speaker of the voice input can learn from output of the further information how and/or where he can get help. In particular, the further information can be referred to as a reaction, in particular a response. As a further addition or alternative, the further information can be wirelessly transmitted from a, in particular the, output location to the capture location. As a further addition or alternative, the capture location can be a location or a position at which the voice input is and/or has been captured. As a further addition or alternative, the output location can be a location or a position at which the information is and/or has been output. As a further addition or alternative, step d) can involve the information being output audibly and/or visually and/or haptically. As a further addition or alternative, step d) can be carried out at the same time as step c) and/or at a time thereafter.

In addition, the invention relates to a, in particular electrical, system for term-dependent output of information based on a voice input to a specific group. The system can be designed in particular for carrying out the method described above. The system according to the invention has at least one, in particular electrical, capture device, and at least one, in particular electrical, analysis device and at least one, in particular electrical, output device. The at least one capture device is designed to capture the voice input. The at least one analysis device is designed to analyze the captured voice input for the presence of a group-specific key term associated, in particular logically, with the specific group. The at least one output device is designed so as, on detection, or in the presence, of the group-specific key term in the analyzed voice input, in particular by the analysis device, to output the information based on the voice input to the specific group.

The system can allow the same advantages as the method described above.

The capture device and the analysis device can be in joint form. Alternatively, the analysis device and the output device can be in joint form. Additionally or alternatively, the output device can be in a form separate from the capture device.

The system or its capture device can be designed for control or activation or triggering by means of a command, in particular a voice command, for capturing the voice input.

The analysis device can have or be a processor, in particular a CPU. In addition, the analysis device can have or be a, in particular electronic and/or magnetic and/or optical, memory, in particular a semiconductor memory or a hard disk drive. In particular, the analysis device can be designed to store the association of the group-specific key term with the specific group, in particular once in advance before the method described above is carried out.

The output device can be designed to be or become associated with the specific group, in particular by means of user operation, in particular by means of a pushbutton and/or a rotary control. In particular, the output device can have or be a, in particular electronic and/or magnetic and/or optical, memory, in particular a semiconductor memory or a hard disk drive. In particular, the output device can be designed to store the association with the specific group, in particular once in advance before the method described above is carried out.

The system can have a smart phone. The capture device and/or the analysis device and/or the output device can be arranged, in particular mounted, in particular integrated, on the smart phone.

In one development of the invention, the capture device and/or the analysis device and/or the output device is/are in mobile form. This allows easy carriage. In particular, mobile can be referred to as portable or carried on the body, in particular worn on the body, or handheld, in particular carried in the hand. Mobile can mean that the applicable device can have a maximum mass of 10 kilograms (kg), in particular of 5 kg, in particular of 2 kg, in particular of 1 kg, in particular of 0.5 kg, in particular of 0.2 kg, in particular of 0.1 kg, in particular of 0.05 kg.

In one refinement of the invention, the system has at least one safety helmet and/or ear protection and/or face protection and/or safety goggles and/or a protective glove and/or a smart watch and/or a bracelet and/or a bangle and/or a headset. The capture device and/or the analysis device and/or the output device is/are arranged, in particular mounted, in particular integrated, on the safety helmet and/or the ear protection and/or the face protection and/or the safety goggles and/or the protective glove and/or the smart watch and/or the bracelet and/or the bangle and/or the headset. This allows it/them to be carried on the body, in particular of a group member.

Additionally or alternatively, the capture device and/or the analysis device and/or the output device can be designed to be or to have been arranged or mounted, in particular detachably, on a, in particular mobile, tool, in particular a garden and/or forestry implement, and/or to be integrated in the tool. In particular, the tool can be designed for, in particular haptically, outputting the information, for example by means of a reduced speed and/or a specific clocking pattern.

In one development of the invention, the capture device has a microphone or is a microphone. Additionally or alternatively, the output device has a sound generator and/or a display and/or a vibration device or is a sound generator and/or a display and/or a vibration device. In particular, the sound generator can have or be a loudspeaker. The display can be arranged on the safety helmet and/or the face protection and/or the safety goggles, where present. The display can be referred to as a head-mounted display. In particular, the display can be designed to display the information on a visor of the safety helmet, of the face protection and/or of the safety goggles, where present, or to project said information into this/these. The display can be referred to as a head-up display. Additionally or alternatively, the display can have or be a translucent display.

In one development of the invention, the system has a, in particular electrical, distance ascertainment system designed to ascertain a distance between the capture device and the output device. The output device is designed so as, if the ascertained distance is below a distance limit value, to output the information in group-aspecific fashion. In particular, the distance ascertainment system can be designed to ascertain the distance between the capture device and the output device by means of a time-of-flight method and/or from a difference between position coordinates of the capture device and position coordinates of the output device. The distance ascertainment system can have at least one local position determination system and/or at least one satellite position determination system for ascertaining position coordinates. Additionally or alternatively, the output device can be designed so as, if the ascertained distance is not below, in particular if it is above, the distance limit value, to output the information only or exclusively in group-specific fashion.

In one development of the invention, the system has a, in particular electrical, wireless transmission system designed to wirelessly transmit the captured voice input and/or the information from the capture device and/or from the analysis device to the analysis device and/or to the output device, in particular from a capture location to an output location. In particular, the transmission system can be designed to use a radio signal for transmission, in particular a Bluetooth signal and/or a WLAN signal and/or a mobile radio signal and/or a satellite radio signal. The transmission system can be referred to as a radio transmission system, in particular as a Bluetooth transmission system and/or as a WLAN transmission system and/or mobile radio transmission system and/or satellite radio transmission system. Additionally, the distance ascertainment system, where present, and the transmission system can be in joint form; in particular, a transmission signal, in particular the radio signal, can be used or exploited for distance ascertainment, in particular by means of the time-of-flight method, where provided for.

In one development of the invention, the system has a, in particular electrical, direction ascertainment system designed to ascertain a direction from the output device to the capture device. The information has the ascertained direction. In particular, the direction ascertainment system can be designed to ascertain the direction from the output device to the capture device by means of a compass and/or by means of a radio beacon and/or from a difference between position coordinates of the capture device and position coordinates of the output device. The direction ascertainment system can have at least one local position determination system and/or at least one satellite position determination system for ascertaining position coordinates. Additionally, the direction ascertainment system and the transmission system, where present, can be in joint form; in particular, a transmission signal, in particular the radio signal, can be used or exploited for direction ascertainment.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
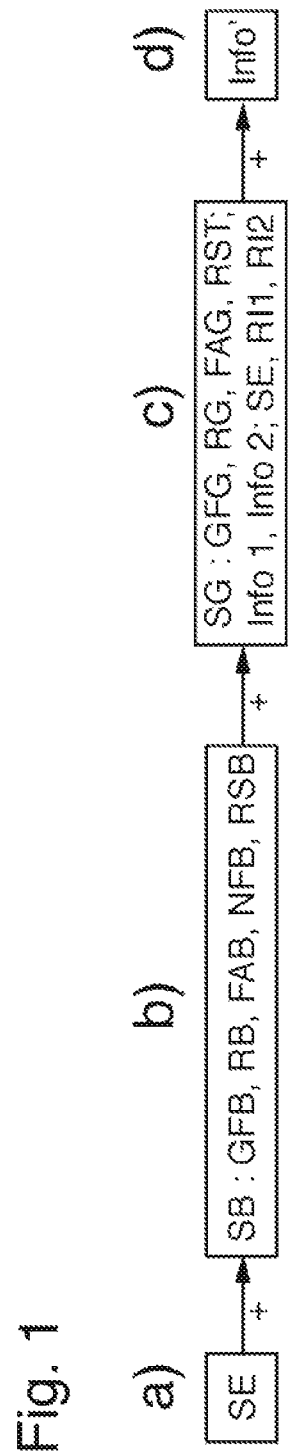
FIG. 1 is a flowchart for an exemplary method according to the invention.

FIG. 1 shows a method for term-dependent output of information Info1, Info2 based on a voice input SE to a specific group SG. The method has the steps of: a) capturing the voice input SE; b) analyzing the captured voice input SE for the presence of a group-specific key term SB associated with the specific group SG; and c) on detection of the group-specific key term SB in the analyzed voice input SE, outputting the information Info1, Info2 based on the voice input SE to the specific group SG.

Figure 2:
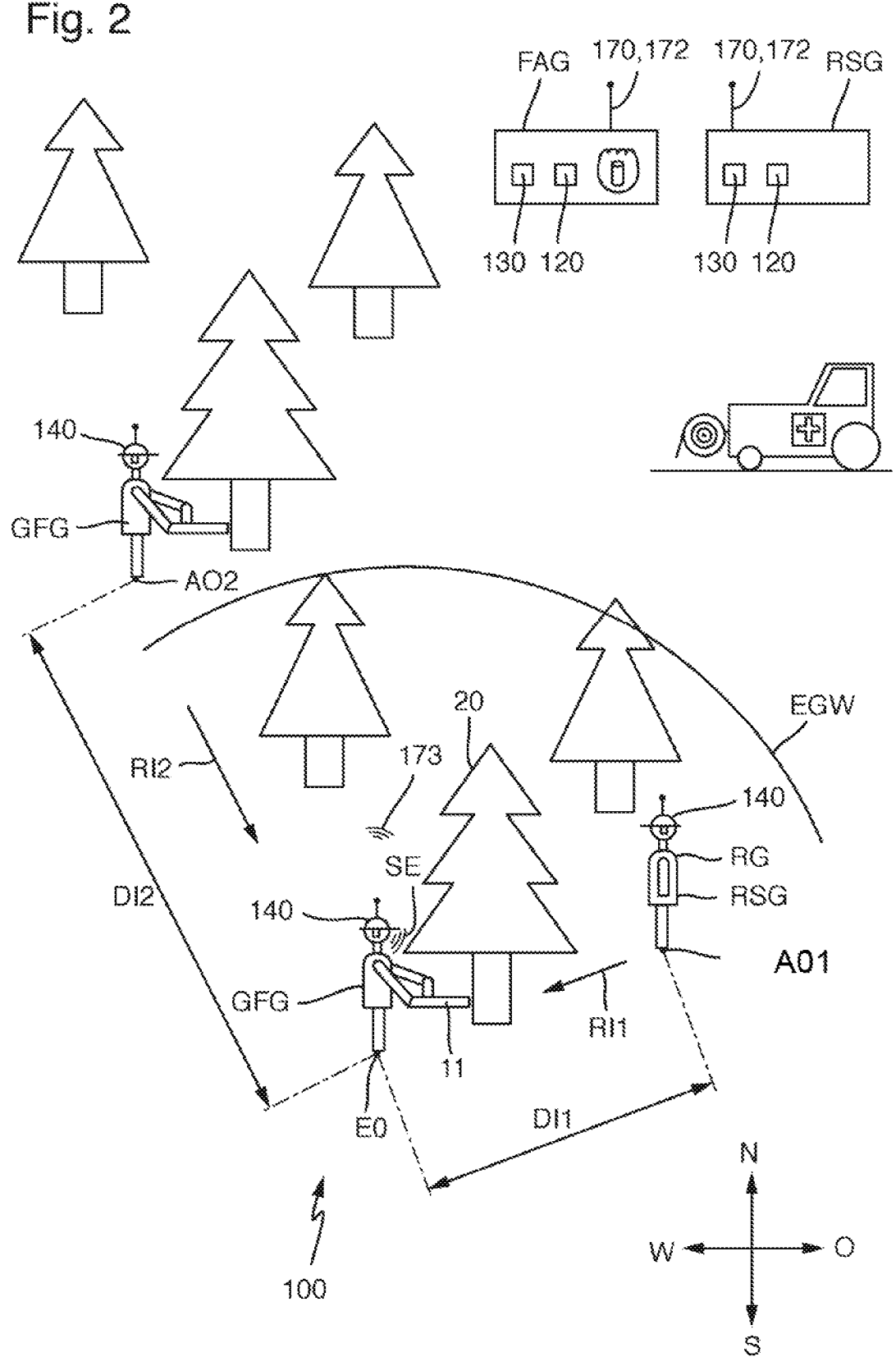
FIG. 2 shows an exemplary system according to the invention.
Figure 3:
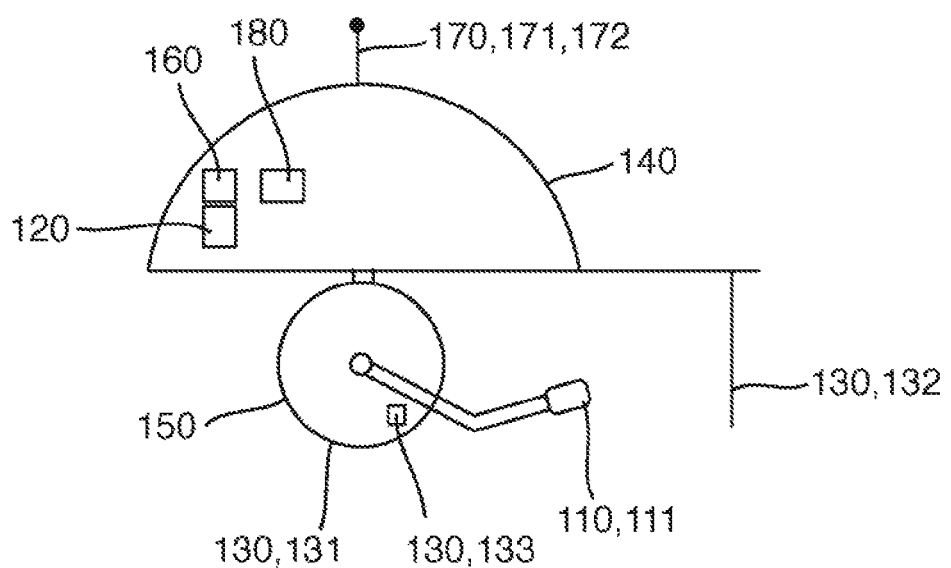
FIG. 3 shows a safety helmet with ear protection in the system from FIG. 2.

FIGS. 2 and 3 show a system 100 for term-dependent output of the information Info1, Info2 based on the voice input SE to the specific group SG. The system 100 has at least one capture device 110, at least one analysis device 120 and at least one output device 130. The at least one capture device 110 is designed to capture the voice input SE. The at least one analysis device 120 is designed to analyze the captured voice input SE for the presence of the group-specific key term SB associated with the specific group SG. The at least one output device 130 is designed so as, on detection of the group-specific key term SB in the analyzed voice input SE, to output the information Info1, Info2 based on the voice input SE to the specific group SG.

In detail, the system 100 is designed for carrying out the method described above.

FIG. 2 shows multiple different specific groups SG.

In detail, one of the specific groups SG is a garden and/or forestry worker group GFG, in particular a felling group. The group-specific key term SB is a garden and/or forestry term GFB, in particular a felling term.

In the exemplary embodiment shown, the garden and/or forestry worker group GFG has two group members. In alternative exemplary embodiments, the specific group can have only a single group member or more than two group members. In addition, in the exemplary embodiment shown, each of the group members carries a garden and/or forestry implement 11 in his hands, in particular a chainsaw for felling a tree 20.

Another of the specific groups SG is a hauler group RG. The group-specific key term SB is a hauler term RB.

In the exemplary embodiment shown, the hauler group RG has only a single group member in the form of a driver of a hauler vehicle. In alternative exemplary embodiments, the specific group can have two or more group members.

Yet another of the specific groups SG is a forestry and/or work management group FAG. The group-specific key term SB is a forestry and/or work management term FAB.

In the exemplary embodiment shown, the forestry and/or work management group FAG is depicted in the form of a work management control center having a cloud memory.

Yet another of the specific groups SG is a rescue group RSG. The group-specific key term SB is an emergency term NFB and/or a rescue term RSB.

In the exemplary embodiment shown, the rescue group RSG has two group members in the form of a first aider and an emergency call control center. In alternative exemplary embodiments, the specific group can have only a single or more than two group member(s). In addition, in the exemplary embodiment shown, the driver of the hauler vehicle is simultaneously the first aider. Put another way: this natural person is a member in two groups. In alternative exemplary embodiments, the driver of the hauler vehicle and the first aider can be different people.

In the exemplary embodiment shown, the system 100 has a plurality of capture devices 110, in detail three. In alternative exemplary embodiments, the system can have only a single, two, four, five or more than five capture device(s). In addition, in the exemplary embodiment shown, the system 100 has a plurality of analysis devices 120, in detail five. In alternative exemplary embodiments, the system can have only a single, two, three, four or more than five analysis device(s). Additionally, in the exemplary embodiment shown, the system 100 has a plurality of output devices 130, in detail five. In alternative exemplary embodiments, the system can have only a single, two, three, four or more than five output device(s).

Further, in the exemplary embodiment shown, at least some of the capture devices 110, of the analysis devices 120 and of the output devices 130 are in mobile form.

In detail, the system 100 has at least one safety helmet 140 having ear protection 150, in the exemplary embodiment shown three safety helmets 140 having ear protection 150. The safety helmet 140, or its ear protection 150, has one of the capture devices 110, one of the analysis devices 120 and one of the output devices 130 arranged on it, or integrated in the safety helmet 140 with its ear protection 150, as shown in FIG. 3. In alternative exemplary embodiments, the system can have at least one safety helmet and/or ear protection and/or face protection and/or safety goggles and/or a protective glove and/or a smart watch and/or a bracelet and/or a bangle and/or a headset, wherein the capture device and/or the analysis device and/or the output device can be arranged on the safety helmet and/or the ear protection and/or the face protection and/or the safety goggles and/or the protective glove and/or the smart watch and/or the bracelet and/or the bangle and/or the headset.

In FIG. 2, the safety helmets 140 with the ear protection 150 are worn by the group members of the garden and/or forestry worker group GFG, the hauler group RG and the rescue group RSG, or the driver of the hauler vehicle and first aider.

In detail, the capture device 110 has a microphone 111. In addition, the output device 130 has a sound generator 131 in the form of a loudspeaker, a display 132 in the form of a head-mounted display, in particular a head-up display, and a vibration device 133. In alternative exemplary embodiments, the output device can have either a sound generator or a display or a vibration device.

In step c), the information Info1, Info2 is output audibly, in particular by means of the sound generator 131, and/or visually, in particular by means of the display 132, and/or haptically, in particular by means of the vibration device 133.

In addition, the system 100 has a wireless transmission system 170. The wireless transmission system 170 is designed to wirelessly transmit the captured voice input SE from the capture device 110, in particular a member of a specific group SG, to the analysis device 120 and/or to the output device 130, in particular of another member of a, in particular the, specific group SG.

In the exemplary embodiment shown, the wireless transmission system 170 has a plurality of transmitters 171, in particular having an antenna, in detail three. In alternative exemplary embodiments, the wireless transmission system can have only a single, two, four, five or more than five transmitter device(s). In addition, in the exemplary embodiment shown, the wireless transmission system 170 has a plurality of receivers 172, in particular having the antenna, in detail five. In alternative exemplary embodiments, the wireless transmission system can have only a single, two, three, four or more than five receiver(s).

In detail, the safety helmet 140, or its ear protection 150, has one of the transmitters 171 and one of the receivers 172 arranged on it, or integrated in the safety helmet 140 with its ear protection 150.

The method has the step of: wirelessly transmitting the captured voice input SE, in particular from a member of a specific group SG to another member of a, in particular the, specific group SG, in particular by means of the wireless transmission system 170.

In alternative exemplary embodiments, the wireless transmission system can additionally or alternatively be designed to wirelessly transmit the information from the analysis device, in particular of one member, to the output device, of another member. As a further addition or alternative, in alternative exemplary embodiments, the method can have the step of: wirelessly transmitting the information, in particular from one member to another member.

In the exemplary embodiment shown, a radio signal 173 is used for transmission, or the transmission system is designed to use a radio signal 173 for transmission.

Additionally, the system 100 has a distance ascertainment system 160. The distance ascertainment system 160 is designed to ascertain a distance DI1, DI2 between the capture device 110 and the output device 130. The output device 130 is designed so as, if the ascertained distance DI1 is below a distance limit value EGW, to output the information Info1 in group-aspecific fashion.

In the exemplary embodiment shown, the system 100 has a plurality of distance ascertainment systems 160, in detail three. In alternative exemplary embodiments, the system can have only a single, two, four, five or more than five distance ascertainment system(s).

In detail, the safety helmet 140, or its ear protection 150, has one of the distance ascertainment systems 160 arranged on it, or integrated in the safety helmet 140 with its ear protection 150.

The method has the steps of: ascertaining the distance DI1, DI2 between a capture location EO and an output location AO1, AO2, in particular by means of the distance ascertainment system 160. If the ascertained distance DI1 is below the distance limit value EGW, the information Info1 is output in group-aspecific fashion.

In the exemplary embodiment shown, the distance DI1, DI2 is ascertained by way of a time-of-flight method, in particular a time-of-flight measurement of the radio signal 173, or the distance ascertainment system 160 is designed to ascertain the distance DI1, DI2 between the capture device 110 and the output device 130 by way of the time-of-flight method, in particular the time-of-flight measurement of the radio signal 173.

In detail, the distance limit value EGW is in a range from 30 m to 150 m; in particular, the distance limit value EGW is 50 m.

Further, the system 100 has a direction ascertainment system 180. The direction ascertainment system 180 is designed to ascertain a direction RI1, RI2 from the output device 130 to the capture device 110. The information Info1, Info2 has the ascertained direction RI1, RI2.

In the exemplary embodiment shown, the system 100 has a plurality of direction ascertainment systems 180, in detail three. In alternative exemplary embodiments, the system can have only a single, two, four, five or more than five direction ascertainment system(s).

In detail, the safety helmet 140, or its ear protection 150, has one of the direction ascertainment systems 180 arranged on it, or integrated in the safety helmet 140 with its ear protection 150.

The method has the step of: ascertaining the direction RI1, RI2 from the output location AO1, AO2 to the capture location EO. The information Info1, Info2 has the ascertained direction RI1, RI2.

Also, the method has the step of: d) outputting further information Info' based on the output information Info1, Info2 to a speaker of the voice input SE and/or at a, in particular the, capture location EO.

In the exemplary embodiment shown, one of the members of the garden and/or forestry worker group GFG speaks the voice input SE with the group-specific key term SB, or the garden and/or forestry term GFB "Tree falling", at the same time as or during the felling of the tree 20.

The voice input SE is captured, in particular at the capture location EO.

The captured voice input SE is wirelessly transmitted to, in particular possible, output locations AO1, AO2.

The other member of the garden and/or forestry worker group GFG, or his output location AO2, is further than the distance limit value EGW away from the capture location EO. Therefore, the, in particular received, voice input SE is analyzed there.

The group-specific key term SB, or the garden and/or forestry term GFB "Tree falling", is detected.

Therefore, the information Info2 based on the voice input SE is output to the specific group SG, or the garden and/or forestry worker group GFG, in particular to the other member of the garden and/or forestry worker group GFG.

In detail, the information Info2 has the voice input SE itself. Additionally, the information Info2, or the voice input SE, is supplemented with the word "warning". As a further addition, the direction RI2 from the output location AO2 to the capture location EO is ascertained and the information Info2 has the ascertained direction RI2, in the exemplary embodiment shown the point of the compass "South-South-East".

In particular, the other member of the garden and/or forestry worker group GFG is haptically made aware that the information Info2 is output. The information Info2 is output audibly. In addition, the information Info2 is output visually; in particular, the words "Tree falling, warning!" and an arrow pointing in the direction RI2 of the capture location EO, or of the tree 20, are inserted into the field of vision of the other member of the garden and/or forestry worker group GFG.

The forestry and/or work management group FAG, or the work management control center, is further than the distance limit value EGW away from the capture location EO. Therefore, the, in particular received, voice input SE is analyzed there.

Since the voice input SE contains no forestry and/or work management term and therefore the latter is not detected, no information is output to the forestry and/or work management group FAG, or in the work management control centre.

The emergency call control center is further than the distance limit value EGW away from the capture location EO. Therefore, the, in particular received, voice input SE is analyzed there.

Since the voice input SE contains no emergency term and no rescue term and these are therefore not detected, no information is output in the emergency call control center.

The first aider, or the driver of the hauler vehicle, or his output location AO1, is less than the distance limit value EGW away from the capture location EO. Therefore, the information Info1 is output to him there in group-aspecific fashion.

In detail, the information Info1 has the voice input SE itself. Additionally, the information Info1, or the voice input SE, is supplemented with the word "warning". As a further addition, the direction RI1 from the output location AO1 to the capture location EO is ascertained and the information Info1 has the ascertained direction RI1, in the exemplary embodiment shown the point of the compass "South West".

In particular, the first aider, or the driver of the hauler vehicle, is haptically made aware that the information Info1 is output. The information Info1 is output audibly. In addition, the information Info1 is output visually; in particular, the words "Tree falling, warning!" and an arrow pointing in the direction RI1 of the capture location EO, or of the tree 20, are inserted into the field of vision of the first aider, or the driver of the hauler vehicle.

In the exemplary embodiment shown, the distance is ascertained first and then, if at all, the voice input is analyzed. In alternative exemplary embodiments, the voice input can be analyzed first and then, if at all, the distance can be ascertained. In further alternative exemplary embodiments, the distance does not need or is not able to be ascertained.

As the exemplary embodiments shown, and explained above, demonstrate, the invention provides a method for term-dependent output of information based on a voice input to a specific group and a system for term-dependent output of information based on a voice input to a specific group, each of which has improved properties, in particular more functionalities, and is therefore user friendly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for automatic term-dependent output of information based on a voice input to a specific group, the method comprising the steps of:
    a) capturing, via a capture device, the voice input;
    b) analysing, via an analysis device, the captured voice input for a presence of a group-specific key term, associated with the specific group;
    c) on detection of the group-specific key term in the analyzed voice input, outputting, via an output device, the information based on the voice input to the specific group;
    ascertaining, via a distance ascertainment system, a distance between a capture location of the voice input and an output location; and
    if the ascertained distance is below a distance limit value, outputting, via the output device, the information in group-aspecific fashion.

2. The method according to claim 1, wherein the specific group is one or more of:
    a garden and/or forestry worker group, and the group-specific key term is a garden and/or forestry term,
    a hauler group, and the group-specific key term is a hauler term,
    a forestry and/or work management group, and the group-specific key term is a forestry and/or work management term, and
    a rescue group, and the group-specific key term is an emergency term and/or a rescue term.

3. The method according to claim 1, further comprising the step of:
    ascertaining a direction from an output location to a capture location, and
    wherein the information has the ascertained direction.

4. The method according to claim 1, wherein the distance is ascertained by a time-of-flight method.

5. The method according to claim 1, further comprising the step of:
   wirelessly transmitting the captured voice input and/or the information.

6. The method according to claim 1, wherein
   step c) involves the information being output audibly, visually and/or haptically.

7. The method according to claim 1, further comprising the step of:
   d) outputting further information based on the output information to a speaker of the voice input and/or at a capture location.

8. A system for term-dependent output of information based on a voice input to a specific group, the system comprising:
   at least one capture device configured to capture the voice input;
   at least one analysis device configured to analyze the captured voice input for a presence of a group-specific key term associated with the specific group;
   at least one output device configured so as, on detection of the group-specific key term in the analyzed voice input, to output the information based on the voice input to the specific group, and
   a distance ascertainment system configured to ascertain a distance between the capture device and the output device, wherein
   the output device is configured so as, if the ascertained distance is below a distance limit value, to output the information in group-aspecific fashion.

9. The system according to claim 8, wherein
   the capture device, the analysis device and/or the output device are in mobile form.

10. The system according to claim 9, further comprising:
    at least one safety helmet, ear protection, face protection, safety goggles, a protective glove, a smart watch, a bracelet, a bangle and/or a headset, and
    wherein the capture device, the analysis device, and/or the output device are arranged on the safety helmet, the ear protection, the face protection, the safety goggles, the protective glove, the smart watch, the bracelet, the bangle and/or the headset.

11. The system according to claim 8, wherein
    the capture device has a microphone, and/or
    the output device has a sound generator, or a display, and/or a vibration device.

12. The system according to claim 8, further comprising:
    a wireless transmission system configured to wirelessly transmit the captured voice input and/or the information from the capture device and/or from the analysis device to the analysis device and/or to the output device.

13. The system according to claim 8, further comprising:
    a direction ascertainment system configured to ascertain a direction from the output device to the capture device, wherein
    the information has the ascertained direction.

14. The method according to claim 1, wherein outputting the information in group-aspecific fashion outputs the information to members of the specific group and to non-members of the specific group.

15. The system according to claim 8, wherein outputting the information in group-aspecific fashion outputs the information to members of the specific group and to non-members of the specific group.

\* \* \* \* \*